Jan. 8, 1957 C. H. GRANBERRY 2,776,692
LOCK NUT WITH AXIALLY AND RADIALLY DISTORTED THREAD PORTIONS
Filed Dec. 17, 1952

Inventor
CARL H. GRANBERRY
by Hill, Sherman, Meroni, Gross & Simpson
Attys.

2,776,692
Patented Jan. 8, 1957

2,776,692

LOCK NUT WITH AXIALLY AND RADIALLY DISTORTED THREAD PORTIONS

Carl H. Granberry, Chicago, Ill.

Application December 17, 1952, Serial No. 326,472

3 Claims. (Cl. 151—21)

This invention relates to lock nuts and is more particularly concerned with the construction of a one-piece, multiple-distorted nut which is capable of acting as a stop or lock device.

I am aware that a large number of lock nuts of varying types have been in use in industry and that a large number of different constructions have been proposed for such devices. However, to my knowledge none of the prior art structures, either patented or in commercial production, embody the semi-flexibility found in the lock nut of the present invention.

The prior art devices have generally proved unsatisfactory for various reasons. One of the major causes of failure has been fatigue fracture which renders the nut unsuitable for unlimited reuse. This fatigue results from the use of resilient portions of the nut and is particularly prevalent in lock nuts in which rather large extending spring portions are present with a relatively small area of metal support.

A second major cause of unsatisfacatory performance is the presence of excessive rigidity in the locking action. Some prior art lock nuts have been constructed by merely deforming the usual solid nut to provide an elliptical or otherwise deformed portion in the threaded bore. While this deformity has naturally provided a friction grip when the nut is wrenched down upon the stud or bolt with which it is used, the gripping action is apt to be so extreme that the threads of the stud are deformed and continued use of the nut and stud combination is impractical.

It is therefore an object of the present invention to provide a lock nut which utilizes overhanging resilient portions of a limited nature and which also provides an inwardly deflected portion, the combination of the two providing a resiliency sufficient to maintain the nut in a locked or adjusted position but which is insufficient to render the nut subject to fatigue fracture or to cause permanent deformation of the threads of the stud.

Another object of the present invention is to provide an extremely simple one-piece lock nut utilizing multi-directional gripping action.

Still another object of the present invention is the provision of a simple lock nut of multiple deformed locking portions.

Yet a further object of the present invention is the provision of an inexpensive lock nut which is capable of continued reuse without fatigue fracture.

Still other and further objects will readily become apparent to those skilled in the art from the attached sheet of drawings in which two embodiments of the present invention are shown by way of illustrative example only.

Figure 1:
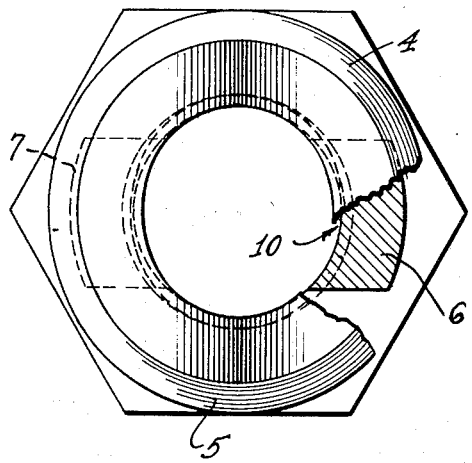
Figure 1 shows a plan view, partially broken away of the novel lock nut of my invention.
Figure 2:
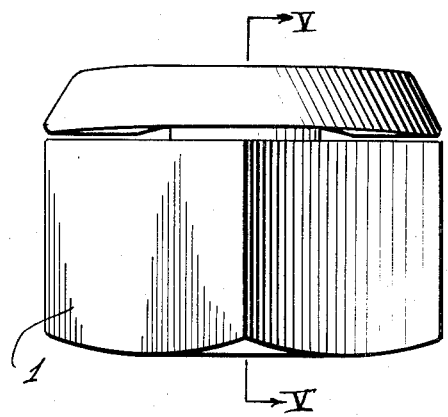
Figure 2 is a side elevational view of the lock nut shown in Figure 1 viewed from the right side thereof.
Figure 3:
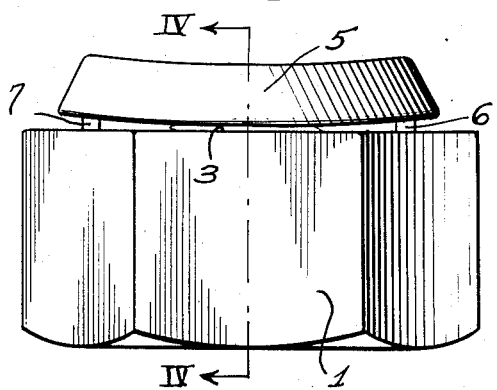
Figure 3 is a side elevational view of the lock nut shown in Figure 2 viewed from the lower side thereof.

As shown in the drawings the nut comprises a body portion 1 which may be hexagonal in form as shown in these drawings, or square, or any other generally recognized commercial form adapted to the generally used wrenches.

Figure 4:
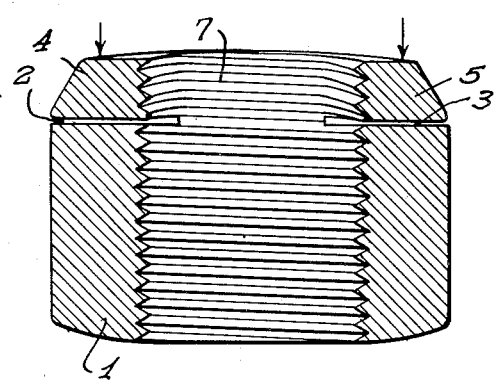
Figure 4 is a cross-sectional view of the lock nut of the present invention taken along the line IV—IV of Figure 3.

As may clearly be seen from Figure 4 a pair of circumferential or chordal slots 2 and 3 are provided near the upper portion or top of the nut, which engages the threads of the stud or bolt last. The slots 2 and 3 provide arcuate overhanging portions 4 and 5 which are secured to the main body portion 1 by the upright post sections 6 and 7, which provide adequate support at both ends of the arc.

In order to provide a self-locking action to the nut as above described, the overhanging lip portions 4 and 5 are permanently deformed in a direction toward the main body of the nut by the application of pressure in the direction of the arrows in Figure 4. This deflection causes a curvature of the threads clearly shown in Figure 5 where deflection of the overhanging portion 4 is almost sufficient to cause engagement of the overhanging portion 4 with the main body of the nut at a point 8. The effect of this initial deformation is to provide a spring action when the stud is threaded completely through the nut which provides a frictional grip to the sides of the threads of the stud tending to squeeze the thread in a direction axial of the screw.

This friction grip is sufficient to maintain the screw in a locked or adjusted position for a light or medium duty load but is insufficient to provide heavy duty protection. This limitation is due to the fact that in order to provide the necessary resiliency it is necessary to utilize a rather substantial lateral slot.

Figure 5:
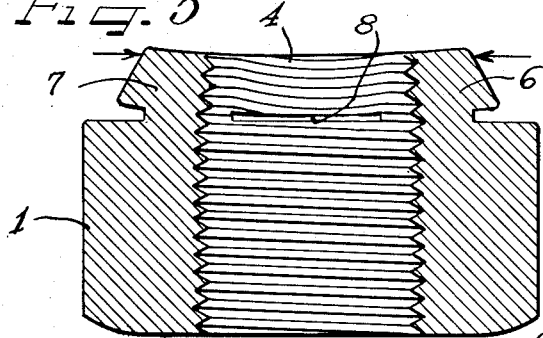
Figure 5 is a cross-sectional view of the lock nut taken along the line V—V of Figure 2.

In order to increase the gripping action to a point where the nut is suitable for heavy duty installations I have provided a radial deformation of the nut at a point not previously deformed. This radial deformation is introduced at the upstanding post portions 6 and 7 as shown in Figures 1 and 5. Posts 6 and 7 are deformed radially inwardly by a force applied in the direction of the arrows shown in Figure 5. The force thus applied deflects the posts inwardly from a point of minimum deflection located near the base of the upright posts to a point of maximum deflection reached at the top of the lock nut. The radial deflection of the posts 6 and 7 forms an eliptical opening at the top of the lock nut, a condition which is slightly exaggerated in the drawings for sake of clarity and which is clearly shown by the broken away portion of the drawing in Figure 1 wherein the total extent of the deformation is indicated clearly by the general arrow 10.

It should be noted that the radial deformation utilized in the present lock nut is not of the type utilized in the prior art in which the entire bulk of the upper portion nut maintains the radial deformation. As explained above these prior art devices are far too rigid for continued reuse and hence are unsatisfactory. On the other hand the present construction utilizes a resiliently supported, radially inward, deformation. The deformation, while applied at the posts 6 and 7 also causes a slight deformation of the resilient overhanging, axially depressed portions 4 and 5 which provides an interaction between the posts and the overhanging portions.

It will be apparent that when the nut is threaded onto a stud, the forcing of the nut onto the stud will cause the posts 6 and 7 to be radially forced outwardly as the threads at the top of the nut are engaged by the stud. This movement outwardly of the posts is resisted not only by the natural resiliency of the post sections themselves but also by the resiliency of the overhanging lip portions 4 and 5 which must also be deformed in order to permit the radial outward movement of the posts 6 and 7. Thus, the overhanging portions 4 and 5 not only serve to provide an axial friction pressure on the threads of the stud when the lock nut is completely threaded thereon but also act to provide a control of the resiliency of the posts 6 and 7. This combined action operates to provide a radial pressure at the posts 6 and 7 which is sufficiently resilient in nature to prevent any permanent distortion of the threads of the stud and yet which is sufficiently rigid to handle heavy duty installations in which the lock nut is subject to severe vibration.

Figure 6:
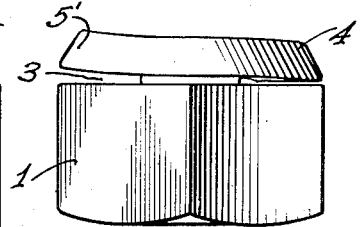
Figure 6 is a modified form of the lock nut shown in Figure 1 and in accordance with the principles of the present invention.

The modification shown in Figure 6 is identical in principle to that shown in Figures 1 through 5 with the exception that rather than depressing the lips of 4 and 5 both downwardly toward the main body of the lock nut, I have deflected the lip 5′ upwardly. This modification has been found particularly effective in installations such as connecting rods where an exact tension is required and the upwardly deflecting lip provides a friction on one surface of the thread while the lower downwardly deflected lip provides a friction force on the underside of the thread. This has also proved effective in installations utilizing the nut as a stop nut on a long stud, in which installations it has been found to aid in preventing any tendency toward a different frictional coefficient depending on the direction of movement of the nut along the stud thereby assuring a constant position of the nut.

It will thus be apparent that I have provided a novel lock or stop nut which utilizes a combined multiple-deformation in which the deformed portions cooperate with each other to provide a resilient locking action of controlled flexibility suitable for heavy, as well as the usual light and medium, duty lock nut installations, and which is not subject to fatigue failure since the overhanging or upstanding portions which provide the flexibility are adequately supported. The dual axial and radial deformation provides a novel and extremely effective lock nut action and yet is capable of inexpensive manufacture.

It will be understood that variations and modifications may be made within the scope of the novel concepts of the present invention.

I claim as my invention:

1. A self-locking nut comprising a body having a threaded bore, said body having diametrically opposed transverse slots formed in the periphery thereof adjacent one end of the nut and intersecting said bore to provide a pair of thread bearing transverse overhanging unbroken lip portions separated by a pair of thread bearing post portions, said lip portions and the threads thereon being permanently deformed along the axis of the nut to provide an axially directed friction force on the threads of a stud threaded through the bore, and the post portions forming the ends of said slots being permanently deformed radially inwardly to provide a radially applied friction force against said stud whereby said nut will be effectively maintained in adjusted position on said stud.

2. A self-locking nut having a threaded bore and a plurality of chordal slots providing apertures from the outer periphery of said nut into the inner periphery and through the threads thereof, said slots being separated by axially directed thread bearing posts and providing transverse thread bearing overhanging unbroken segmental lip portions the ends of which are secured to said posts, said overhanging portions being deformed at portions thereof intermediate said posts in an axial direction thereby deforming the threads thereof, and said posts and the threads thereof being deformed radially inwardly whereby said overhanging portions coact with said posts to control the resiliency and deflection thereof to thereby maintain the wedging action of said threads against the threads of a stud when said nut is threaded thereon.

3. A self-locking nut having a threaded bore and a plurality of chordal slots providing apertures from the outer periphery of said nut into the inner periphery and through the threads thereof, said slots being separated by axially directed thread bearing posts rigidly secured to the body of said nut and providing thread bearing overhanging unbroken segmental lip portions the ends of which are rigidly secured to said posts, said overhanging portions and the threads thereof being deformed at portions intermediate said posts in an axial direction, and said posts and the threads thereof being deformed radially inwardly whereby said overhanging portions coact with said posts to control and maintain the resiliency and resist deflection of the lip portions and posts when said nut is threaded onto a stud.

References Cited in the file of this patent

UNITED STATES PATENTS

| 188,055 | Johnson | Mar. 6, 1877 |
| 2,068,613 | Stoll | Jan. 19, 1937 |
| 2,142,820 | Olson | Jan. 3, 1939 |
| 2,213,353 | Whitcombe | Sept. 3, 1940 |
| 2,314,780 | Gade | Mar. 23, 1943 |
| 2,391,712 | King et al. | Dec. 25, 1945 |
| 2,445,696 | Rudd | July 20, 1948 |

FOREIGN PATENTS

| 1,649 of 1943 | Great Britain | Nov. 26, 1903 |
| 401,449 | Italy | Jan. 20, 1943 |
| 574,732 | Great Britain | Jan. 17, 1946 |
| 929,985 | France | July 28, 1947 |